Patented Feb. 13, 1945

UNITED STATES PATENT OFFICE 2,369,137

INSECTICIDAL AND FUNGICIDAL MATERIALS

Gerald H. Coleman and Gerald A. Griess, Midland, Mich., assignors to The Dow Chemical Company, Midland, Mich., a corporation of Michigan No Drawing. Application April 30, 1943,
Serial No. 485,168

6 Claims. (Cl. 167—31)

This invention relates to insecticidal and fungicidal materials and particularly to the 4.4'-diamino-diphenyl-methane mono-salts of 2.4-dinitro-6-hydrocarbon-substituted phenols and compositions in which they are employed as toxic ingredients.

Many synthetic organic compounds have been suggested as substitutes for lead arsenate and copper-containing inorganic compounds and for pyrethrum, rotenone and other naturally occurring insecticidal products. Almost without exception these synthetic toxicants are injurious to plant foliage so that their use must be carefully controlled. Further disadvantages accruing to many of such synthetic organic materials are their toxicity to humans and incompatibility with other insecticidal products.

The dinitro-phenols have been suggested as insecticidal toxicants and, when properly compounded, are highly efficient for the control of selected agricultural pests. Many of these compounds, however, are sufficiently soluble in water as to form aqueous solutions which have a corrosive action on plant tissue. Furthermore, certain of the more common dinitro-phenols are relatively impermanent in their action due to high volatility, and tendencies to leach away from plant surfaces on contact with water and to oxidize or otherwise disintegrate upon contact with air.

We have discovered that the addition salts of 4.4'-diamino-diphenylmethane with 2.4-dinitro-6-hydrocarbon-substituted phenols are effective insecticidal and fungicidal toxicants and that compositions comprising these difficultly water-soluble products may be applied to growing foliage without causing injury to the extent previously inherent to the use of many of the nitrophenols and/or salts thereof. The group of compounds falling within the scope of the present invention are those having the formula

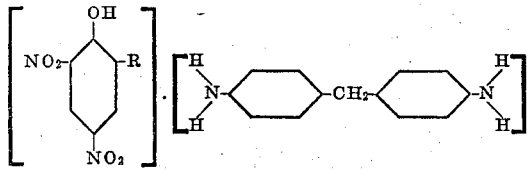

wherein R represents an alkyl radical containing from 1 to 8 carbon atoms, inclusive, phenyl, or cyclohexyl. These compounds are high melting crystalline solids soluble to the extent of less than 0.05 per cent by weight in water at 25° C., difficultly soluble in many common organic solvents, and stable to light and air. The preferred embodiments of the invention consist of the mono-salts of 2.4-dinitro-6-cyclohexyl-phenol and 2.4-dinitro-6-secondarybutyl-phenol.

The new compounds are particularly valuable as constituents of insecticidal and fungicidal compositions for use as spray or dusts and especially where living plants are to be contacted with the parasiticidal mixture. The low water solubility, high melting point, stability, and low vapor pressure characterizing the new toxicants enables them to exert an extended residual toxicity against fungus and insect pests. Such desirable action is accompanied by a minimum of plant and foliage injury when the compounds are properly compounded in spray and dust compositions. A further advantage in the use of these salts lies in the fact that their low solubility and high stability permits their use in combination with common organic and inorganic insecticidal and fungicidal toxicants which heretofore have been considered incompatible with phenols and their salts.

In employing the amine salt compounds as constituents of insecticidal and fungicidal dusts, the compounds may be mixed or otherwise incorporated with various inert diluents or carriers, such as diatomaceous earth, bentonite, talc, sulphur, wood flours, inorganic phosphates, lime, volcanic ash, clays, etc. If desired, such dusts may be employed as concentrates and suspended in water or other liquid carrier to form sprays. The new addition salts may also be incorporated with various wetting, dispersing, and sticking agents and subsequently diluted to produce dust or spray compositions in which the amine salt is present in any desired concentration. In the preparation of concentrates, from above 5 to about 80 per cent by weight of the amine salt is commonly employed. The concentration of the amine salt in spray or dust compositions on application to living vegetation is preferably between about 0.001 and 5.0 per cent by weight. The particular manner in which the amine salt is compounded and employed and the concentration thereof in the final composition are dependent upon the type of insect, fungus, or mold to be controlled, and the circumstances under which such control is to be accomplished.

In other embodiments of the invention, the new amine salts may be employed in combination with oil emulsions. They may also be applied in water suspension with or without an additional emulsifying, wetting, or dispersing agent. The amine salts may similarly be incorporated in other standard type insecticidal and fungicidal compositions either as the sole toxicant ingredient, or in combination with such materials as inorganic pigments, organic dyes, lead arsenate, pyrethrum, rotenone, organic thiocyanates, inorganic fluorides, sulphur, copper compounds and related toxicant substances.

The following examples are illustrative with respect to the particular compounds, composition types, and concentrations employed but are not to be construed as limiting the invention.

EXAMPLE 1

18.2 parts by weight of the 4.4'-diamino-diphenyl-methane mono-salt of 2.4-dinitro-6-cyclohexyl-phenol, 72.7 parts of diatomaceous earth, and 9.1 parts of sodium lauryl sulphate were mixed together and ground in a ball mill. Sufficient of this composition was dispersed in water to give a concentration of 0.5 pound of the amine salt toxicant per 100 gallons. This spray was applied to potato vines heavily infested with Colorado potato beetle larvae and killed 100 per cent of the latter within three days of application, without any substantial injury to the leaves. In a control determination, lead arsenate at 3 pounds per 100 gallons gave a kill of only 72.7 per cent of the potato beetle larvae, and caused a yellowing around the edges of the leaves contacted therewith. The spray composition containing the amine salt was also employed as a fungicidal mixture for the treatment of bean mildew, and found to give a control of between 85 and 90 per cent, without material injury to bean foliage.

The dust mixture, as described above, was dispersed in water to give a concentration of 0.125 pound of the amine-salt toxicant per 100 gallons, and this spray mixture applied for the control of red spider adults on beans. A 100 per cent kill of red spider was thereby obtained without injury to the bean foliage.

EXAMPLE 2

The 4.4'-diamino-diphenylmethane mono-salt of 2.4-dinitro-6-methyl-phenol was substituted for the corresponding salt of 2.4-dinitro-6-cyclohexyl-phenol in the dust composition as described in the preceding example. An aqueous spray composition, containing the dust concentrate in such amount as to give a dispersion of 0.5 pound of the amine toxicant per 100 gallons, was found to give a kill of 90 per cent against poplar aphis and to give a control of 80 per cent when applied as a fungicidal spray against bean mildew.

EXAMPLE 3

16.6 parts by weight of the 4.4'-diamino-diphenyl-methane mono-salt of 2.4-dinitro-6-secondarybutyl-phenol was ground with 66.7 parts of diatomaceous earth and 16.6 parts of sodium lauryl sulphate. The resulting dust concentrate was dispersed in water substantially as described in the preceding examples. A spray mixture containing 0.25 pound per 100 gallons of the amine-salt toxicant gave 100 per cent kill of red spider adults on beans without causing any substantial injury to the bean foliage. A similar composition containing 0.5 pound of amine-salt toxicant per 100 gallons of spray gave 90 per cent control against bean mildew.

Other mixtures which may be employed as dusts or as constituents of spray materials for the control of insects and fungi include the following:

*Composition A*

| | Parts by weight |
|---|---|
| 4.4'-diamino-diphenylmethane mono-salt of 2.4-dinitro-6-normal hexyl-phenol | 89 |
| Red talc | 10 |
| Sodium lauryl sulphate | 1 |

The foregoing mixture is ground, or otherwise mixed, to obtain a concentrate adapted to be dispersed in water to form fungicidal and insecticidal spray compositions.

*Composition B*

| | Parts by weight |
|---|---|
| 4.4'-diamino-diphenylmethane mono-salt of 2.4-dinitro-6-phenyl-phenol | 20 |
| Bentonite | 80 |

This composition is adapted to be dispersed in water in the amount of from about 0.5 to 10 pounds per 100 gallons to obtain parasiticidal spray mixtures useful for the control of a wide variety of insect and fungous pests.

*Composition C*

| | Parts by weight |
|---|---|
| 4.4'-diamino-diphenylmethane mono-salt of 2.4-dinitro-6-normal octyl-phenol | 1 |
| Sulphur | 99 |

This composition is prepared by grinding the amine-salt and sulphur together to obtain a dust mixture of average particle size of 5 microns diameter or less. The resulting product is adapted to be dusted directly on plants or soil surfaces as a fungicidal agent.

*Composition D*

| | Parts by weight |
|---|---|
| 4.4'-diamino-diphenylmethane mono-salt of 2.4-dinitro-6-cyclohexyl-phenol | 2 |
| Walnut shell flour | 98 |

This composition may be prepared by grinding the amine-salt and walnut shell to a dust of approximately 325 screen mesh. The product may be dusted directly on the leaf and fruit surfaces of citrus for the control of citrus red mite.

*Composition E*

| | Parts by weight |
|---|---|
| 4.4'-diamino-diphenylmethane mono-salt of 2.4-dinitro-6-tertiarybutyl-phenol | 80 |
| Sodium lauryl sulphate | 20 |

The foregoing composition is prepared by grinding together the amine-salt and sodium lauryl sulphate, and is adapted to be dispersed in water in any suitable proportion to form an insecticidal and fungicidal spray composition.

The 4.4'-diamino-diphenylmethane mono-salts of the 2.4-dinitro-6-hydrocarbon-substituted phenols, in compositions as described above, are relatively nontoxic to humans as compared to most inorganic insecticides and fungicides containing lead, arsenic, mercury, cyanide, copper, etc., at present used for pest control. They are substantially non-explosive and difficultly flammable. Numerous instances in which they have been contacted with the skin of humans, indicate that they are noncorrosive and are not inclined to produce dermatitis, even on repeated application.

Other fungous pests against which the compositions set forth in the preceding examples are adapted to be applied are *Fomes annosus, Diplodia pinea, Sphaeropsis malorum*, brown rot, and apple scab. Similarly, the compositions may be employed against such insect and mite organisms as fall web-worm, walnut worm, aphis, thrips, three-spotted mite, etc.

The compounds as described in the foregoing examples may be prepared by reacting 4.4'-diamino-diphenylmethane with a 2.4-dinitro-6-hydrocarbon-substituted phenol in benzene, chloro-benzene, or alcohol. The amount of reactants and the temperature of reaction are not critical, although substantially equimolecular proportions of the amine and phenol, and a temperature of between about 40° and 120° C. are preferably employed. The amine mono-salt of the phenol precipitates during the reaction, and is conveniently separated by filtration from the reaction mixture. In certain instances, it is desirable to cool the reaction mixture prior to the separation, particularly where the amine-salt compound has an appreciable solubility in the solvent employed. The separated product is then washed and dried, or recrystallized if desired.

The following examples illustrate the preparation of 4.4'-diamino-diphenylmethane mono-salts of representative 2.4-dinitro-6-hydrocarbon-substituted phenols:

EXAMPLE 4

13.3 grams of 2.4-dinitro-6-cyclohexyl-phenol was dissolved in 30 milliliters of hot benzene and a solution of 9.9 grams of 4.4'-diamino-diphenylmethane in 30 milliliters of hot ethanol added portionwise thereto with stirring. A vigorous reaction took place with the evolution of heat. The mixture was stirred for several hours, and thereafter cooled to 10° C. and filtered. The residue from the filtration was washed with cold ethanol and dried to obtain 19.5 grams of the 4.4'-diamino-diphenylmethane mono-salt of 2.4-dinitro-6-cyclohexyl-phenol in the form of orange crystals, melting at 106.4°–107.2° C. This compound was somewhat soluble in 95 per cent ethanol and in carbon tetrachloride, difficultly soluble in kerosene, and soluble in water at 25° C. to the extent of 0.016 per cent by weight. The saturated water solution had a pH of 6.0. The compound has the formula

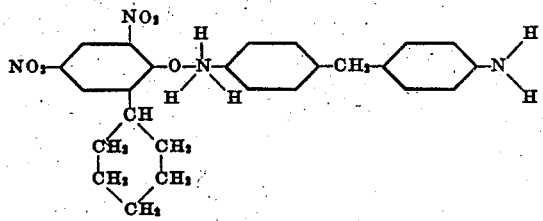

EXAMPLE 5

0.1 mole proportions of 2.4-dinitro-6-methyl-phenol and of 4.4'-diamino-diphenylmethane were reacted together in 100 milliliters of hot ethanol. A heavy yellow precipitate was formed. An additional 50 milliliters of ethanol was added, and the mixture heated and stirred until all of the precipitate was in solution. The alcoholic solution was then cooled to below room temperature, and filtered to obtain 35 grams of a crude salt product melting at 109°–110° C. This product was recrystallized from benzene to obtain 33 grams of the 4.4'-diamino-diphenylmethane mono-salt of 2.4-dinitro-6-methyl-phenol as bright yellow crystals, melting at 110°–111° C., and having the formula

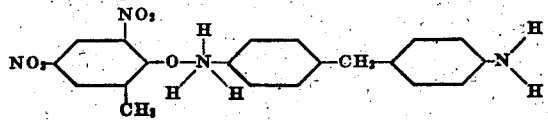

The compound was found to be somewhat soluble in alcohol and in carbon tetrachloride, substantially insoluble in kerosene, and soluble in water at 25° C. to the extent of 0.033 per cent by weight.

EXAMPLE 6

22 grams of 2.4-dinitro-6-secondarylbutyl-phenol and 19.8 grams of 4.4'-diamino-diphenyl-methane were mixed together with 25 milliliters of 95 per cent ethanol. The mixture was stirred and warmed to the boiling temperature of the ethanol and thereafter cooled. The semi-solid crude product was filtered, and the residue washed with cold ethanol and air dried to obtain 27 grams of the 4.4'-diamino-diphenylmethane mono-salt of 2.4-dinitro-6-secondarybutyl-phenol as orange crystals, melting at 89°–92° C. and having the following formula

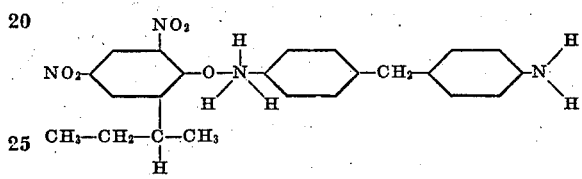

This compound was found to be somewhat soluble in 95 per cent ethanol and in carbon tetrachloride, difficultly soluble in kerosene, and soluble in water at 25° C. to the extent of 0.035 per cent by weight. The pH of a saturated water solution at 25° C. was 5.7.

In a similar fashion, other 2.4-dinitro-6-hydro-carbon-substituted phenols may be reacted with 4.4'-diamino-diphenylmethane to obtain solid salts of such phenols adapted to be employed in insecticidal and fungicidal compositions substantially as described. Among the compounds which may be obtained are the 4.4'-diamino-diphenylmethane mono-salts of 2.4-dinitro-6-phenyl-phenol, 2.4-dinitro-6-tertiary-butyl-phenol, 2.4-dinitro-6-normalhexyl-phenol, and 2.4-dinitro-6-normal octyl-phenol.

We claim:

1. An insecticidal and fungicidal composition comprising as a toxic ingredient, a compound having the formula

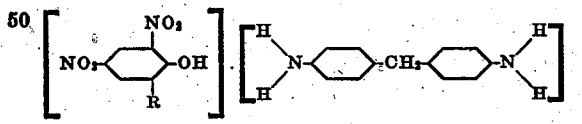

wherein R represents a member of the group consisting of alkyl radicals containing from 1 to 8 carbon atoms, inclusive, the phenyl radical, and the cyclohexyl radical and a carrier therefor.

2. An insecticidal and fungicidal composition comprising a mixture of a finely divided inert diluent and, as a toxic ingredient, a compound having the formula

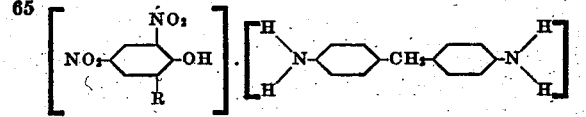

wherein R represents a member of the group consisting of alkyl radicals containing from 1 to 8 carbon atoms, inclusive, the phenyl radical, and the cyclohexyl radical.

3. An insecticidal and fungicidal spray comprising an aqueous dispersion of a finely divided compound having the formula

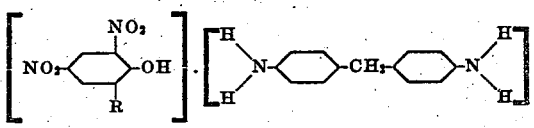

wherein R represents a member of the group consisting of alkyl radicals containing from 1 to 8 carbon atoms, inclusive, the phenyl radical, and the cyclohexyl radical.

4. An insecticidal and fungicidal composition comprising as a toxic ingredient the 4.4'-diamino-diphenylmethane mono-salt of 2.4-dinitro-6-cyclohexyl-phenol, having the formula

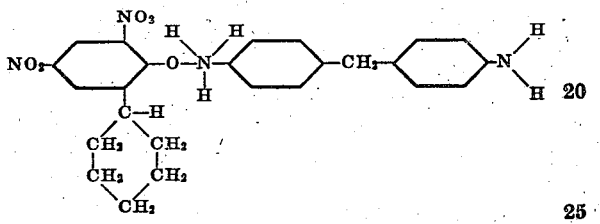

and a carrier therefor.

5. An insecticidal and fungicidal composition comprising as a toxic ingredient the 4.4'-diamino-diphenylmethane mono-salt of 2.4-dinitro-6-secondarybutyl-phenol, having the formula

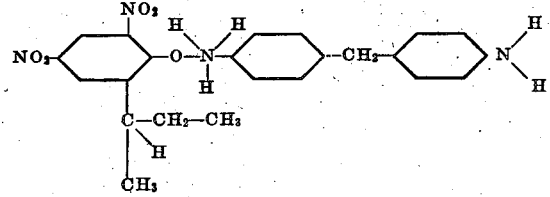

and a carrier therefor.

6. An amine salt having the formula

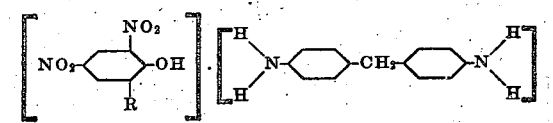

wherein R represents a member of the group consisting of alkyl radicals containing from 1 to 8 carbon atoms, inclusive, the phenyl radical, and the cyclohexyl radical.

GERALD H. COLEMAN.
GERALD A. GRIESS.